UNITED STATES PATENT OFFICE.

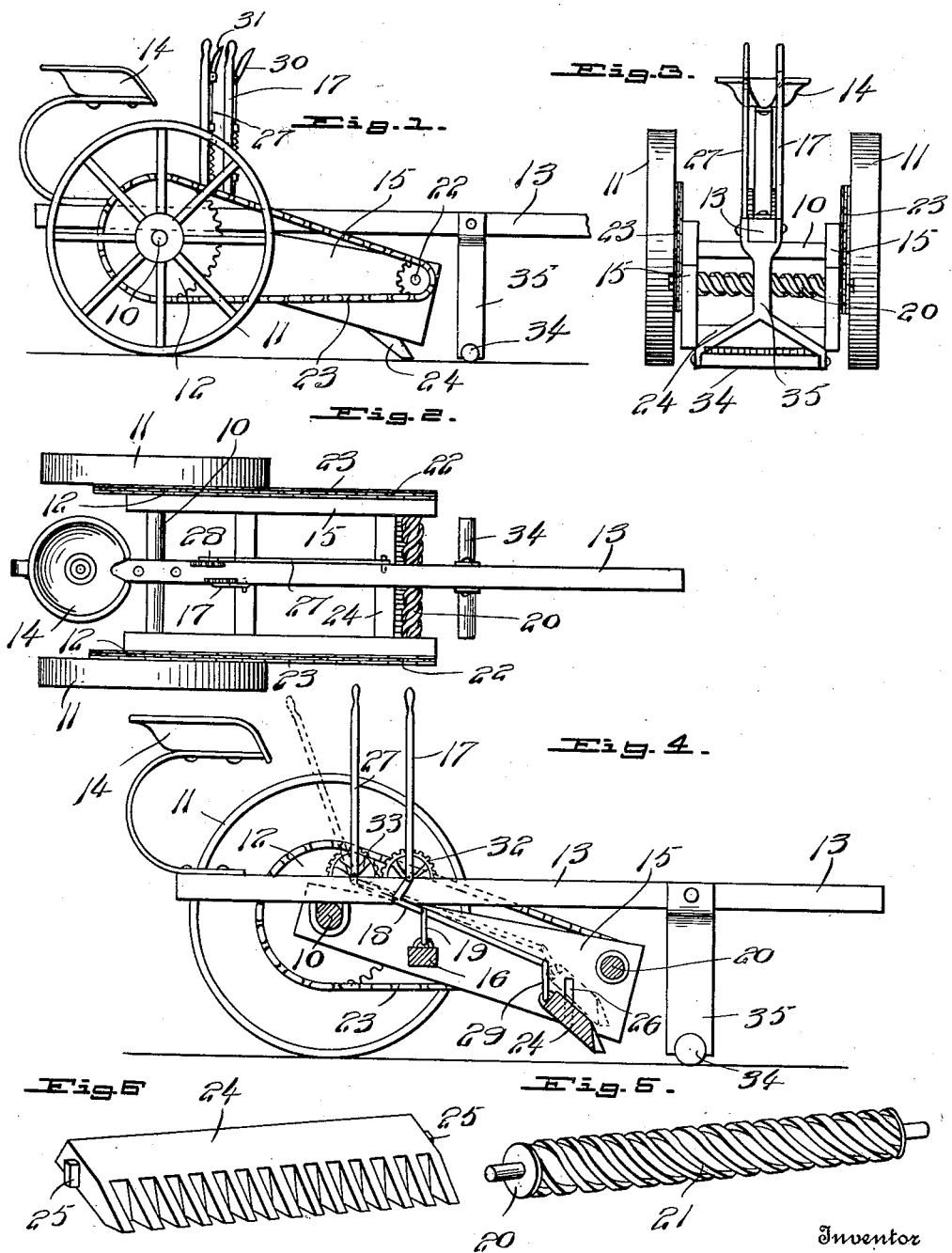

OSCAR H. GREENE, OF FALLON, NEVADA.

GROUND-PULVERIZER.

1,101,921.   Specification of Letters Patent.   Patented June 30, 1914.

Application filed September 4, 1913. Serial No. 788,151.

*To all whom it may concern:*

Be it known that I, OSCAR H. GREENE, a citizen of the United States, residing at Fallon, in the county of Churchill, State of Nevada, have invented certain new and useful Improvements in Ground-Pulverizers; and I do hereby declare the following to be a full, clear, and exact description of the invention, such as will enable others skilled in the art to which it appertains to make and use the same.

This invention relates to ground breakers and has for an object to provide an extremely simple and inexpensive device of this character which will have a novel corrugated crushing roller and will also be equipped with a rake in rear of the crushing roller for holding the clods against the latter until they are broken up.

A further object of the invention is to provide means for adjusting the rake relatively to the crushing roller to accommodate the machine to various conditions of soil.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a side elevation of the machine. Fig. 2 is a plan view. Fig. 3 is a front elevation. Fig. 4 is a longitudinal sectional view showing the rake in full lines in one position and in dotted lines in another position. Fig. 5 is a detail perspective view of the roller. Fig. 6 is a detail perspective view of the rake.

Referring now to the drawing in which like characters of reference designate similar parts, the machine is shown to comprise an axle 10 upon the ends of which ground wheels 11 are revolubly mounted, each ground wheel being equipped on the inner side with an integral sprocket gear 12. A tongue 13 is fixed to the axle and is equipped at the rear end with a seat 14.

Pivotally mounted upon the axle is a frame comprising parallel side members 15 which are connected intermediate the ends by a cross bar 16 and are provided at the rear end with suitable openings to pivotally receive the axle. The frame projects forwardly and downwardly under the tongue and may be raised and lowered with respect to the latter by means of a lever 17 which is connected by a bell crank lever 18 and a link 19 to the cross bar 16.

Journaled in the forward end of the side members 15 is a clod breaking roller 20 which is spirally corrugated as shown at 21 between the side members, and outside of the side members is equipped with small sprocket pinions 22 over which and the related sprocket gears 12 carried by the ground wheels, sprocket chains 23 are trained, whereby during advance of the machine the roller is rotated at high speed.

Mounted for vertical sliding movement in the side members below and in rear of the roller is a rake 24, the same sloping downwardly and forwardly as shown, the clods of earth being held by this rake against the roller until broken up whereupon the earth passes over the top of the rake.

In order to move the rake closer to or farther away from the roller than usual to accommodate the device to various sizes of clods, the rake is provided at the ends with lugs 25 which work in vertical slots 26 formed in the side members. An operating lever 27 is pivoted on one of the side members as shown at 28 and is terminally bent laterally and connected to a link 29 disposed on the center of the top edge of the rake.

The frame lifting lever 17 and the rake adjusting lever 27 are equipped with respective latches 30 and 31 and racks 32 and 33 for locking the levers in adjusted positions.

For supporting the front end of the machine a ground roller 34 is revolubly secured in a standard 35 carried by the tongue 13.

In operation the frame may be lowered through the instrumentality of the lever 17 until the rake rides upon the ground, and then the rake may be adjusted close to or away from the breaking roller to accommodate the device to break large or small clods. Upon advance of the machine the clods will be held up against the roller by the rake until broken up and will then pass over the top of the rake and gravitate on to the ground in rear of the rake.

From the above description it will be seen that I have provided an extremely simple and inexpensive ground breaker which may be adjusted to operate on various sizes of clods and which is formed of a few simple parts that will not easily get out of order.

What is claimed is:—

1. A clod breaker including a wheeled axle, a frame pivoted on said axle and extending obliquely downward therefrom, a breaking roller journaled at the free end of said frame, and a rake carried in said frame parallel to and disposed below and in rear of said roller and adapted to hold the clods against said roller until they are broken.

2. A clod breaker including a wheeled axle, a frame pivoted on said axle and extending obliquely downward therefrom, a breaking roller journaled at the free end of said frame, means operated by the ground wheels on said axle to rotate said roller, a rake carried in said frame parallel to and disposed below and in rear of said roller, and means for raising and lowering said rake to dispose the same near to or away from said roller, said rake serving to hold the clods against said roller until broken whereupon the clods pass over the top of said rake.

3. A clod breaker including a wheeled axle, a frame pivoted on said axle and extending obliquely downward therefrom, a tongue projecting forwardly from said axle, means carried by said tongue for raising and lowering said tongue, a corrugated breaking roller carried at the free end of said frame and rotated by the ground wheels of said axle, a rake carried by said frame parallel to and disposed below and in rear of said roller, said rake having terminal lugs slidably fitted in slots formed in said frame, and means carried by the frame for raising said rake in said slots whereby to vary the distance between said roller and said rake.

In testimony whereof, I affix my signature, in the presence of two witnesses.

OSCAR H. GREENE.

Witnesses:
 JAMES SMITH,
 JAMES W. RICHARD.

---

Copies of this patent may be obtained for five cents each, by addressing the "Commissioner of Patents, Washington, D. C."